UNITED STATES PATENT OFFICE.

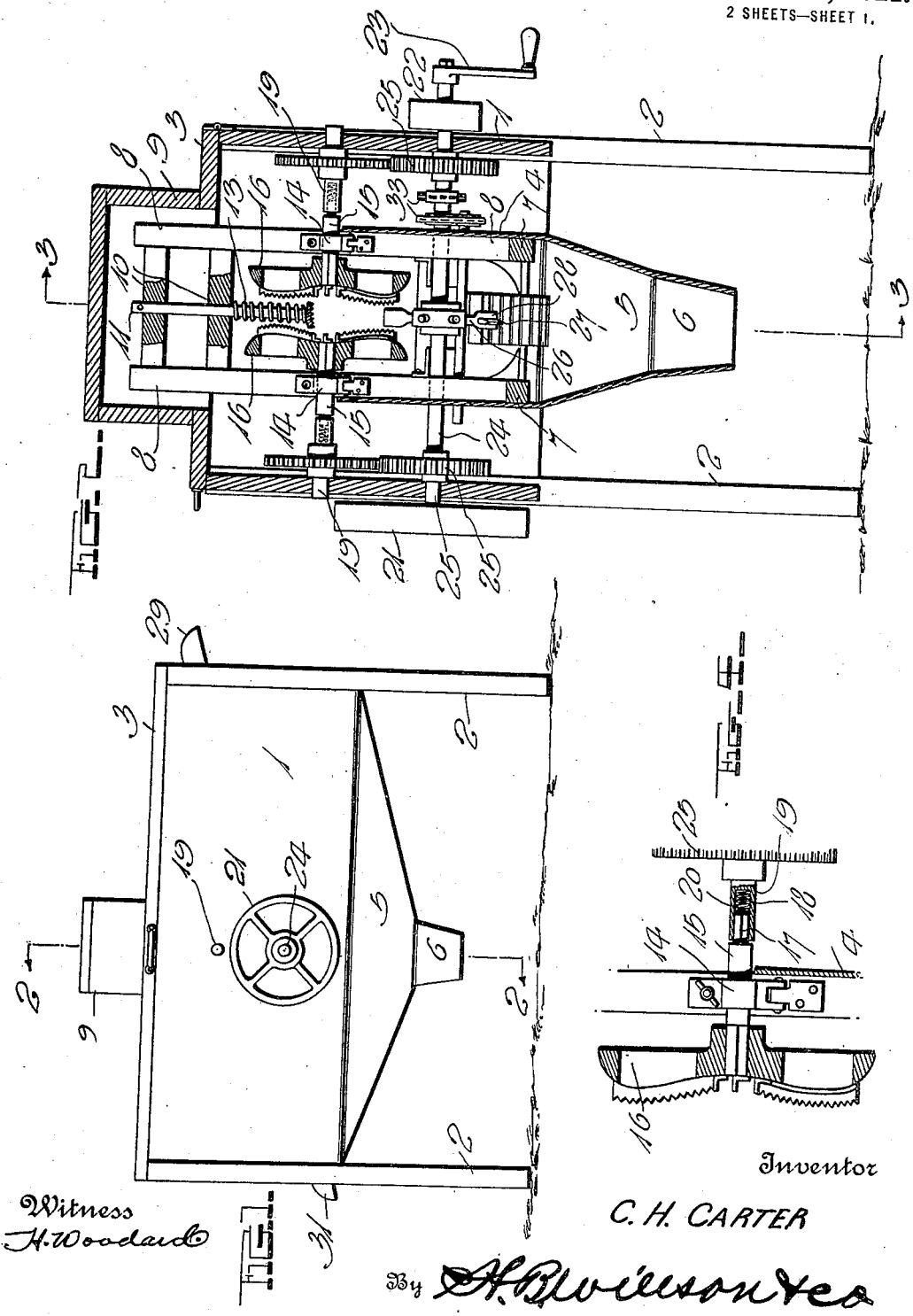

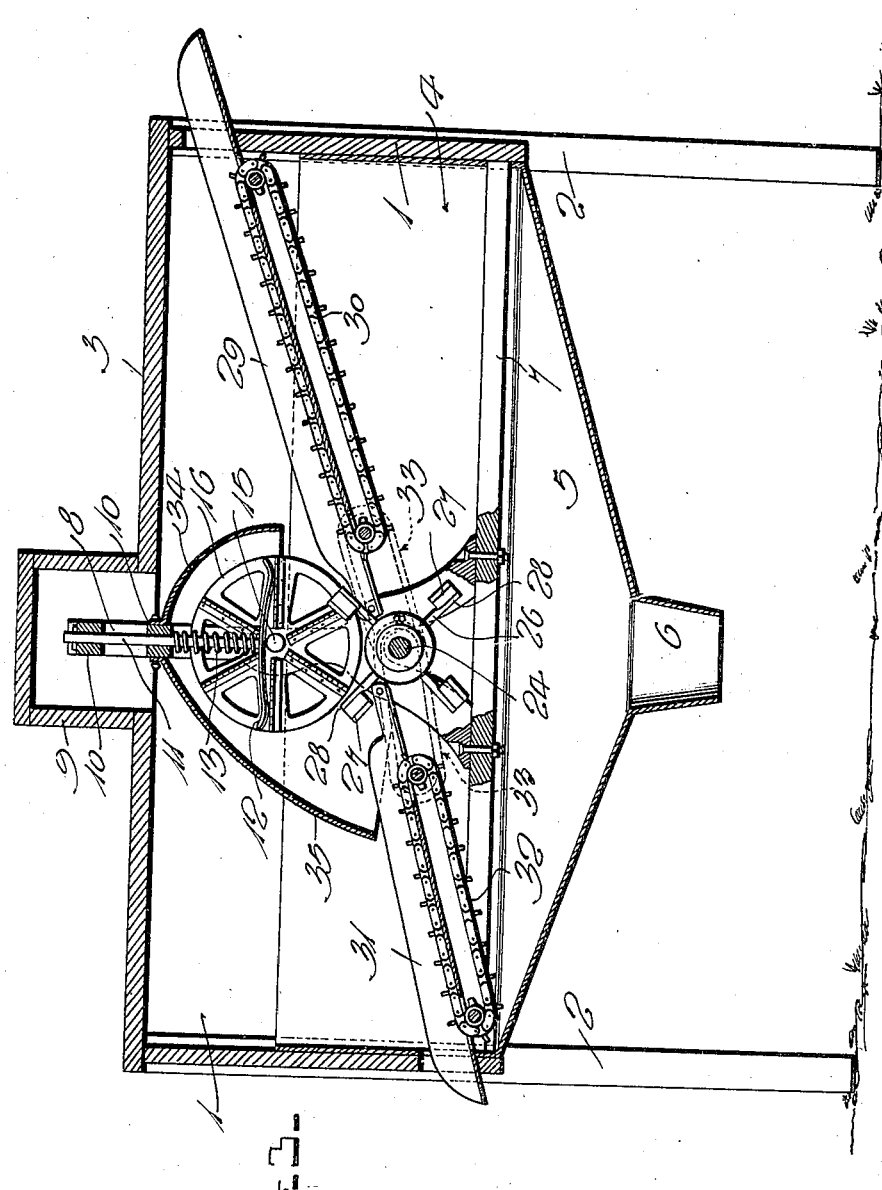

CHARLES H. CARTER, OF FARMERS FORK, VIRGINIA.

AUTOMATIC FISH-CLEANER.

1,394,711.  Specification of Letters Patent.  Patented Oct. 25, 1921.

Application filed April 11, 1921. Serial No. 460,299.

*To all whom it may concern:*

Be it known that I, CHARLES H. CARTER, a citizen of the United States, residing at Farmers Fork, in the county of Richmond and State of Virginia, have invented certain new and useful Improvements in Automatic Fish-Cleaners; and I do declare the following to be a full, clear, and exact description of the invention, such as will enable others skilled in the art to which it appertains to make and use the same.

My invention relates to improvements in machines for scaling and cleaning fish and has for one of its objects to provide a novel arrangement of wheels for removing the scales from the sides, the distance between said wheels being automatically varied according to the size of the fish.

Another object is to provide improved means for cutting the fish open and internally cleaning the same simultaneously with removal of the scales.

A further object is to provide a self-adjusting shoe for scaling the back of the fish and holding the latter down into proper engagement with the cutting and cleaning means.

A still further object is to provide a device which may be inexpensively manufactured and operated, easily cleaned, and one which will be in every way sanitary.

With the foregoing and minor objects in view, the invention resides in the novel construction and association of parts hereinafter described and claimed, the descriptive matter being supplemented by the accompanying drawings.

Figure 1 is a side elevation of a machine constructed in accordance with my invention.

Fig. 2 is a vertical transverse sectional view as designated by line 2—2 of Fig. 1.

Fig. 3 is a central vertical longitudinal sectional view as indicated by line 3—3 of Fig. 2.

Fig. 4 is a detail sectional view showing more particularly the mounting means for the scaling wheels and the arrangement employed for forcing these wheels against the sides of the fish.

In the drawings above briefly described, I have illustrated one form of my invention, but it will be understood that it may be embodied in forms other than that shown and that this illustration is for illustrative purposes only.

The numeral 1 designates a horizontally elongated casing supported on suitable legs 2, said casing being open at its bottom and provided with a top 3 which is preferably hinged so that it may be opened whenever desired to gain access to interior parts, in order that they may be effectively cleaned. Within the casing 1 and extending from end to end thereof is a smaller casing 4 whose sides are of approximately half the height of and spaced inwardly from the sides of the casing 1. The casing 4 is open at its upper end and is provided at its lower end with a hopper-like bottom 5 having an outlet 6 for discharging the offals into a suitable container (not shown).

Extending longitudinally in the casing 4 are two sills 7 from which a pair of standards 8 extend upwardly into a hood 9 with which the hinged cover 3 is provided, said standards being connected near their upper ends by a pair of horizontal bars 10. These bars are provided with vertically alined openings receiving a rod 11 whose lower end carries an elongated shoe 12 which is roughened on its lower side to remove the scales from the backs of the fish. This shoe is forced downwardly under the action of a coil spring 13 and thus serves to hold the fish down into proper engagement with the means described below for splitting the belly of the fish and removing the intestines and offals.

Below the lowermost bar 10, the standards 8 are provided with a pair of horizontally alined releasable bearings 14 which receive a pair of short shafts 15 whose inner ends carry appropriate wheels 16 for scaling the sides of the fish. The outer ends of the shafts 15 are reduced in diameter and squared as seen at 17, said reduced and squared ends being slidably received in sockets 18 in additional shafts 19 which extend through the opposite sides of the casing 1. I have shown coil springs 20 located in the sockets 18 and exerting pressure on the shafts 15 to force the wheels 16 inwardly toward each other, whereby to hold them in proper engagement with the sides of the fish being cleaned, while permitting outward yielding of said wheels according to the size of the fish. Extending transversely across the casings 1 and 4 below the shafts 15 and 19, is another shaft 24 which is driven by gearing 25 from said shafts 19, the gearing being preferably located between the side walls of the two casings as shown in Fig. 2. The central portion of shaft 24 is provided with a plurality of radial arms 26 which carry fish slitting blades 27 all located in a plane at right angles to the shaft axis, said arms being widened at the rear edges of the blades to form scrapers 28 for the purpose of removing the intestines and offals from the fish as the belly of the latter is opened by the knives 27. The fish is held down in proper engagement with the arms 26 by the spring-pressed shoe 12 above described. On one end of the shaft 24, I have shown a fly wheel 21 while the other end of said shaft may be equipped with any suitable means for driving the same, a pulley 22 and a hand crank 23 being shown, so that the machine may be driven either by hand or by power, as occasion may require.

For feeding the fish to the wheels 16 and associated parts, a channel-shaped trough 29 and an endless conveyer 30 in said trough are provided, while a similar trough 31 and conveyer 32 may be employed to carry the cleaned fish from the machine. I have shown both conveyers driven from the shaft 24 by means of sprocket chains 33.

In addition to the features of construction above described, I preferably mount a pair of hoods 34 and 35 on the standards 8 or one of their cross bars 10 so as to cover the upper portions of the scaling wheels 16 and prevent the scales from being thrown to all parts of the casing. When the cover 3 is moved aside, the hoods 34 and 35 may be detached for cleaning and then by releasing the bearings 14, the shafts 15 and the scaling wheels 16 may be entirely removed from the casing, thereby not only permitting them to be readily cleaned, but giving access to the arms 26 and parts carried thereby, so that these parts may be cleaned. In fact, with the several parts removed in the manner specified, the entire interior of the machine is accessible for washing, cleaning or sterilizing.

In operation, the fish are fed down the trough 29 and the conveyer 30 feeds them between the scaling wheels 16 which are pressed inwardly by the springs 20 into tight contact with the sides of the fish. When the fish is received between these wheels, it pushes the shoe 12 upwardly against the tension of the spring 13 and this shoe cleans the back of the fish, at the same time holding the latter down so that the blades will slit the belly, permitting the scrapers 28 to remove the offals. The completely scaled and cleaned fish are discharged from the machine to the trough 31 by means of the conveyer 32 and the offals descend through the outlet 6.

From the foregoing, taken in connection with the accompanying drawings, it will be seen that while I have provided a machine which is rather simple and inexpensive, it will be highly efficient and in every way desirable for obtaining the required results. Since excellent results may be obtained from the details disclosed, these details may be followed if desired. I wish it understood, however, that within the scope of the invention as claimed, numerous minor changes may be made without sacrificing the spirit of the invention as claimed.

I claim:

1. A fish scaling and cleaning machine comprising means for scaling a fish, a rotary shaft having radiating arms provided with blades adapted to slit the belly of the fish, and scrapers associated with said arms and blades for removing the offals as the fish is scraped.

2. A fish scaling and cleaning machine comprising means for removing the scales, and a rotary shaft having radiating arms provided with blades adapted to slit the belly of the fish, the outer ends of said arms being increased in width to form scrapers adapted to remove the offals through the slit.

3. A fish scaling and cleaning machine comprising means for scaling the sides of the fish, means for slitting the belly of the fish and removing the offals through the slit, and means for scaling the back of the fish and pressing the latter toward said belly slitting and offal removing means.

4. A fish scaling and cleaning machine comprising means for scaling the sides of the fish, means for slitting the belly of the fish and removing the offals through the slit, an elongated shoe adapted to engage the back of the fish, said shoe being roughened to remove the scales, and a spring for forcing said shoe into contact with the fish's back and for forcing the fish into proper engagement with said belly splitting and offal removing means.

5. A fish scaling machine comprising a pair of scale removing wheels adapted for contact with the sides of the fish, a pair of short shafts whose inner ends carry said wheels, bearings in which said shafts are slidably mounted, additional short shafts alined with the aforesaid shafts and having sockets slidably and non-rotatably receiving the outer ends of the latter, coil-springs confined in said sockets for forcing said first named shafts toward each other to engage said scale removing wheels with the fish, and means for driving said shafts to operate said wheels.

6. A fish scaling and cleaning machine comprising a pair of scale removing wheels for contact with the sides of the fish, short shafts carrying said wheels, bearings in which said shafts are slidably and rotatably mounted, additional short shafts alined with the first mentioned shafts and having a sliding connection therewith, spring means for forcing said first named shafts inwardly toward each other to engage said scale removing wheels with the fish, a relatively long transverse shaft below said short shafts, gearing connecting the outermost of said short shafts with said relatively long shaft, means for driving one of said shafts, radiating arms at the center of said relatively long shaft having blades at their outer ends adapted to slit the belly of the fish, the outer ends of said arms having scrapers to remove the offals through the slit, and a spring-pressed scale removing shoe between the upper portions of said scale removing wheels.

7. A machine of the class described comprising an outer leg-supporting casing, a relatively small casing within and extending from end to end of said outer casing the vertical side walls of the two casings being disposed in spaced relation, fish scaling and cleaning means within the relatively small casing, the latter having a hopper-like bottom provided with an outlet for the offals, driving means for said scaling and cleaning means located partially in the space between the side walls of the two casings, means for feeding the fish to the scaling and cleaning means, and means for carrying the cleaned fish therefrom.

8. A machine of the class described comprising an outer leg-supported casing open at its bottom and provided with a movable top, a relatively small casing within and extending from end to end of said outer casing, said relatively small casing being open at its top but provided with a hopper-like bottom having an outlet for the offals, the vertical side walls of the two casings being disposed in spaced relation, a pair of sills extending longitudinally within the relatively small casing, standards rising from said sills, fish scaling and cleaning means supported in part by said standards and having driving means partially located in the space between said side walls of the two casings, means for feeding the fish to said scaling and cleaning means, and means for carrying the cleaned fish therefrom.

In testimony whereof I have hereunto set my hand.

CHARLES H. CARTER.